United States Patent [19]

Nagaura

[11] Patent Number: 5,591,546
[45] Date of Patent: Jan. 7, 1997

[54] SECONDARY CELL

[75] Inventor: Toru Nagaura, Fukuoka, Japan

[73] Assignee: Hival Ltd., Fukuoka, Japan

[21] Appl. No.: 425,499

[22] Filed: Apr. 20, 1995

[30] Foreign Application Priority Data

Apr. 21, 1994 [JP] Japan .................................. 6-121708

[51] Int. Cl.$^6$ ................................................ H01M 004/50
[52] U.S. Cl. ........................... 429/218; 429/194; 429/224; 429/156
[58] Field of Search ..................... 429/224, 218, 429/194

[56] References Cited

U.S. PATENT DOCUMENTS

| | | | |
|---|---|---|---|
| 4,366,215 | 12/1982 | Coetzer et al. | 429/224 X |
| 5,162,178 | 11/1992 | Ohsawa et al. | 429/218 |
| 5,284,721 | 2/1994 | Beard | 429/218 X |

*Primary Examiner*—John S. Maples
*Attorney, Agent, or Firm*—Nikaido, Marmelstein, Murray & Oram LLP

[57] ABSTRACT

The present invention provides nonaqueous electrolyte secondary cells capable of withstanding severe overdischarge to obtain nonaqueous electrolyte secondary batteries having satisfactory cycle characteristics. A spinel-type lithium-containing metallic oxide represented by $LiM_2O_4$ (where M is a transitional metal element) is used as an active substance for each of the positive and negative electrodes of the cell embodying the invention. In an organic electrolyte containing lithium ion, the spinel-type lithium-containing metallic oxide represented by $LiM_2O_4$ is capable of reversibly undergoing an electrochemical oxidation reaction involving removal of doping lithium ion and also an electrochemical reduction reaction involving lithium ion doping. Accordingly, when the cell of the invention is overdischarged ($\approx$ reversibly charged), a reversible reaction involving lithium ion doping/undoping occurs at the positive electrode and negative electrode without entailing any damage due to overdischarge. As a result, when many cells are connected in series to obtain a battery, the cycle characteristics of the battery are not impaired even if the component cells are different in capacity.

6 Claims, 3 Drawing Sheets

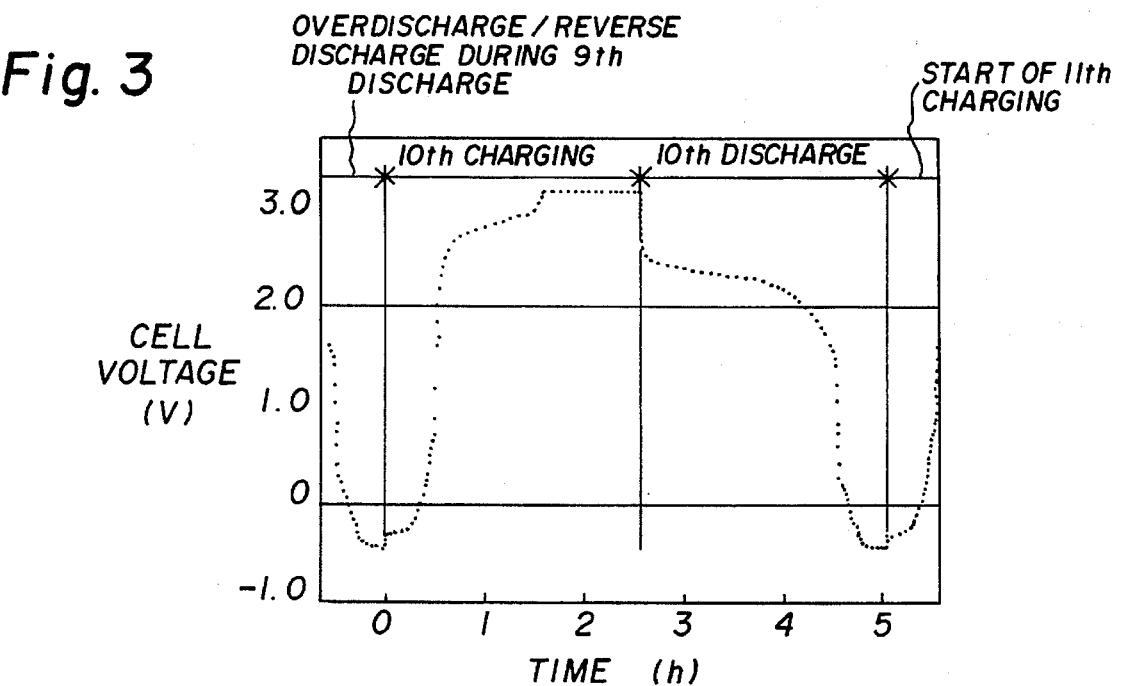
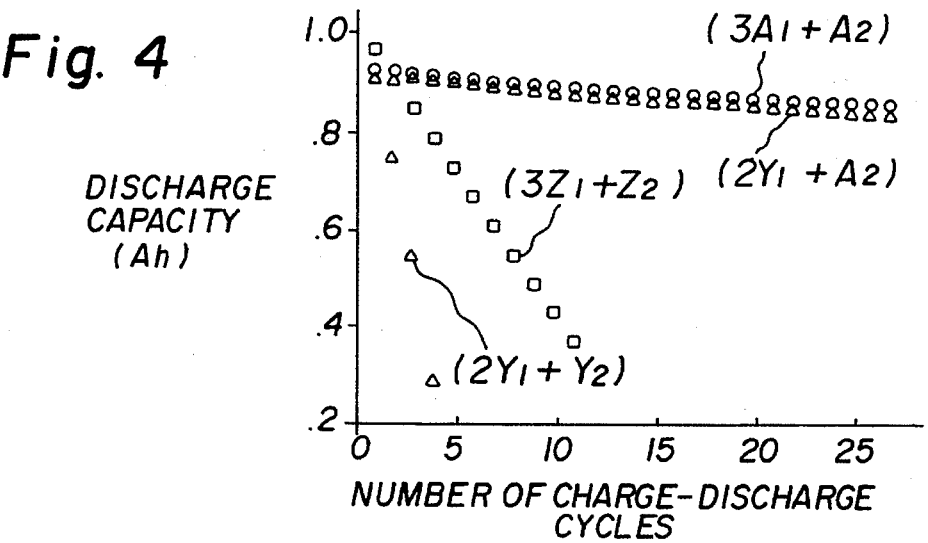

SECONDARY CELL

DETAILED DESCRIPTION OF THE INVENTION

The present invention provides nonaqueous electrolyte secondary cells capable of withstanding severe overdischarge to obtain nonaqueous electrolyte secondary batteries having satisfactory cycle characteristics.

The exhaust gas of motor vehicles is thought to be one of the major causes for the destruction of environment of the earth. In 1998, the new Exhaust Control Act is to be enforced in California, U.S. The act requires that 2% of the total number of vehicles sold by every automaker be emission-free electric vehicles. One of the important components of electric vehicles is the secondary battery, the performance of which governs the basic performance of the vehicle, i.e., acceleration performance and mileage available by one charging operation. Accordingly, it is desired to promptly develop highly efficient large secondary batteries.

Nonaqueous electrolyte secondary batteries are characterized by being lightweight. Attempts were made to realize highly efficient secondary batteries for actual use but have encountered difficulties.

It was only recently that a nonaqueous electrolyte secondary battery was developed which included a negative electrode of carbon to utilize the ingress of lithium ions into and egress thereof from the carbon, and the battery was placed into use immediately. The battery was named a lithium ion secondary battery and introduced into the world for the first time in 1990 by the present inventors ("Progress in Batteries & Solar Cells," Vol. 9, p. 209). Typically, $LiCoO_2$ or $LiMn_2O_4$ is used as the positive electrode active material, and coke or graphite material is used for the negative electrode. The battery has the distinct feature of exhibiting a high voltage of at least 4 V when charged. Presently, the battery is recognized by the name of lithium ion secondary battery in the battery industry and academic world and has been referred to as the secondary battery of the next generation, attracting much attention.

However, the lithium ion secondary battery suffers from a shortening in cycle life when comprising at least two cells which are connected in series because the lithium ion secondary battery shares the common drawback of nonaqueous electrolyte secondary batteries that the battery deteriorates markedly when over-discharged once.

In this case, batteries comprising a multiplicity of cells connected in series, the overall voltage can be maintained at a level capable of operating devices even if some of the cells are overdischarged to 0 V, so that the cells of small capacity are likely to be overdischarged to 0 V. On the other hand, it is difficult to give exactly the same capacity to the multiplicity of cells of the battery which are connected in series. Even if having the same capacity, the cells become different in capacity sooner or later during repeated discharge-charge cycles.

In actuality, therefore, some of the component cells of the battery become overdischarged and seriously impaired in performance by the overdischarge, which greatly shortens the life of the battery.

The lithium ion secondary batteries presently used as the power source of video cameras or the like are provided in the battery pack with a circuit for preventing overdischarge, whereas the provision of the circuit renders the battery more costly and becomes a great obstacle to the wide use of nonaqueous electrolyte secondary batteries.

Further the secondary batteries for electric vehicles require a high voltage, are therefor extremely great in the number of cells constituting the battery and encounter difficulty in the method of preventing overdischarge.

Accordingly, it is impossible to obtain batteries having satisfactory cycle characteristics before completing cells which will not break even if overdischarged and which can be restored to the normal state when subsequently recharged.

An object of the present invention is to provide a nonaqueous electrolyte secondary cell or battery which is free of the impairment of characteristics due to overdischarge.

SUMMARY OF THE INVENTION

The object is fulfilled by using a lithium-containing metallic oxide of the spinel type as an active material for each of the positive electrode and the negative electrode.

A spinel-type lithium-containing metallic oxide represented by $LiM_2O_4$ (wherein M is a transition metal element) is used as an active substance for each of the positive and negative electrodes of the cell embodying the invention. In an organic electrolyte containing lithium ion, the spinel-type lithium-containing metallic oxide represented by $LiM_2O_4$ is capable of reversibly undergoing an electrochemical oxidation reaction involving removal of doping lithium ion and also an electrochemical reduction reaction involving lithium ion doping. For this reason, the cell of the present invention can be reversibly charged and discharged in the forward direction and in the reverse direction.

Accordingly, when the cell of the invention is overdischarged ($\approx$ reversibly charged), a reversible reaction involving lithium ion doping/undoping occurs at the positive electrode and negative electrode without entailing any damage due to overdischarge.

On the other hand, in the case of batteries comprising many cells connected in series for giving a high voltage, it is difficult to give exactly the same capacity to all the cells, and even if having the same capacity, the cells are made different in capacity sooner or later by repeated charging and discharging. With actual batteries, therefore, the overall voltage can be maintained at a level (final voltage) capable of operating devices even if some of the cells are overdischarged to not higher than 0 V, so that the cells of smaller capacity will be overdischarged to 0 V or lower. The overdischarged cells are seriously impaired in performance, consequently markedly shortening the life of the battery.

However, since the cells of the present invention are unimpaired by overdischarge, many cells can be connected in series to obtain a battery which has satisfactory cycle characteristics even if the component cells are different in capacity. Further, when a battery is fabricated from a combination of the cell A of the invention and cells of other type which will be markedly impaired in performance by overdischarge, the cell A is made the smallest of all the component cells in capacity. The battery can then be given satisfactory cycle characteristics because the battery is dischargeable to the final voltage with the cell A overdischarged without overdischarging the other cells.

Consequently, the present invention makes it possible to provide a battery which is satisfactory in cycle characteristics and which has a voltage as high as at least 100 V, as is required of secondary batteries for electric vehicles of power storage.

The cause for the serious impairment of performance of the lithium ion secondary cell due to overdischarge is that when the cell is overdischarged, the dopant lithium no longer remains in the carbon serving as the negative electrode active substance, permitting copper as a negative electrode collector to undergo a negative electrode reaction and dissolve out into the electrolyte.

In an organic electrolyte containing lithium ions, spinel-type lithium-containing metallic oxides represented by $LiM_2O_4$ (wherein M is a transition metal element) are capable of reversibly undergoing electrochemical oxidation and reduction reactions involving undoping/doping with lithium ions as represented by Equation (1) given below, and are also capable of reversibly undergoing electrochemical reduction and oxidation reactions involving lithium ion doping/undoping as represented by Equation (2) below. This means that when the spinel-type lithium containing metallic oxide represented by $LiM_2O_4$ (wherein M is a transition metal element) serves as the cell active substance, charge and discharge in the forward direction, as well as charge and discharge in the reverse direction, are reversible.

Stated more specifically, in the case where $LiM_2O_4$ is the positive electrode active substance, normal charge and discharge reactions reversibly proceed according to Equation (1), and the reactions of Equation (2) can take place reversibly even in the event of an overdischarge.

Further when $LiM_2O_4$ is the negative electrode active substance, normal charge and discharge reactions reversibly proceed according to Equation (2) and the reaction of Equation (1) can take place reversibly even in the event of an overdischarge.

$$Li_{1-x}M_2O_4 \leftrightharpoons LiM_2O_4 \quad (1)$$

$$LiM_2O_4 \leftrightharpoons Li_{1+x}M_2O_4 \quad (2)$$

According to the present invention, a lithium-containing metallic oxide of the spinel type is used as the active material for each of the positive electrode and the negative electrode. The cell of the present invention is a secondary cell adapted for charging and discharging through the cell reactions of Equation (3) wherein A and B are each a transition metal element.

(negative (positive    (negative (positive
electrode) electrode)    electrode) electrode)
[Discharged state]         [Charged state]

With reference to Equation (3), the reactions at the negative electrode are $LiA_2O_4 \leftrightharpoons Li_{1+x}A_2O_4$, and the negative electrode active substance ($LiA_2O_4$) is charged and discharged through the reactions of the Equation (2) above. The reactions at the positive electrode are $LiB_2O_4 \leftrightharpoons Li_{1-x}B_2O_4$, and the positive electrode active substance ($LiB_2O_4$) is charged and discharged through the reactions of Equation (1) above.

The cell thus constructed according to the present invention has the distinct feature that during overcharging (≈reverse charging), a reversible reaction proceeds in which the positive electrode is doped with lithium ion with removal of lithium ion from the negative electrode according to Equation (4) below, hence no damage due to overdischarging.

(negative (positive   (negative (positive
electrode) electrode)   electrode electrode
[Overdischarged state]   [Discharged state]

The reason is that with reference to Equation (4), the reactions at the negative electrode are $Li_{1-x}A_2O_4 \leftrightharpoons LiA_2O_4$, and the negative electrode active substance ($LiA_2O_4$) is overdischarged through the reaction of Equation (1), with the result that the cell reversibly restores its normal charged state similarly through the reaction of Equation (1) when charged.

Further with reference to Equation (4), the reactions at the positive electrode are $Li_{1+x}B_2O_4 \leftrightharpoons LiB_2O_4$, and the positive electrode active substance ($LiB_2O_4$) is overdischarged through the reaction of Equation (2), such that the cell reversibly returns from the overdischarged state to the normal charged state similarly through the reaction of Equation (2) when charged.

BRIEF DESCRIPTION OF THE DRAWINGS

FIG. 3 shows a charge-discharge curve obtained by forcibly discharging the cell of the invention; and FIG. 4 shows the charge-discharge cycle characteristics of batteries.

DETAILED DESCRIPTION OF THE INVENTION AND OF THE PREFERRED EMBODIMENT

Figure 1:
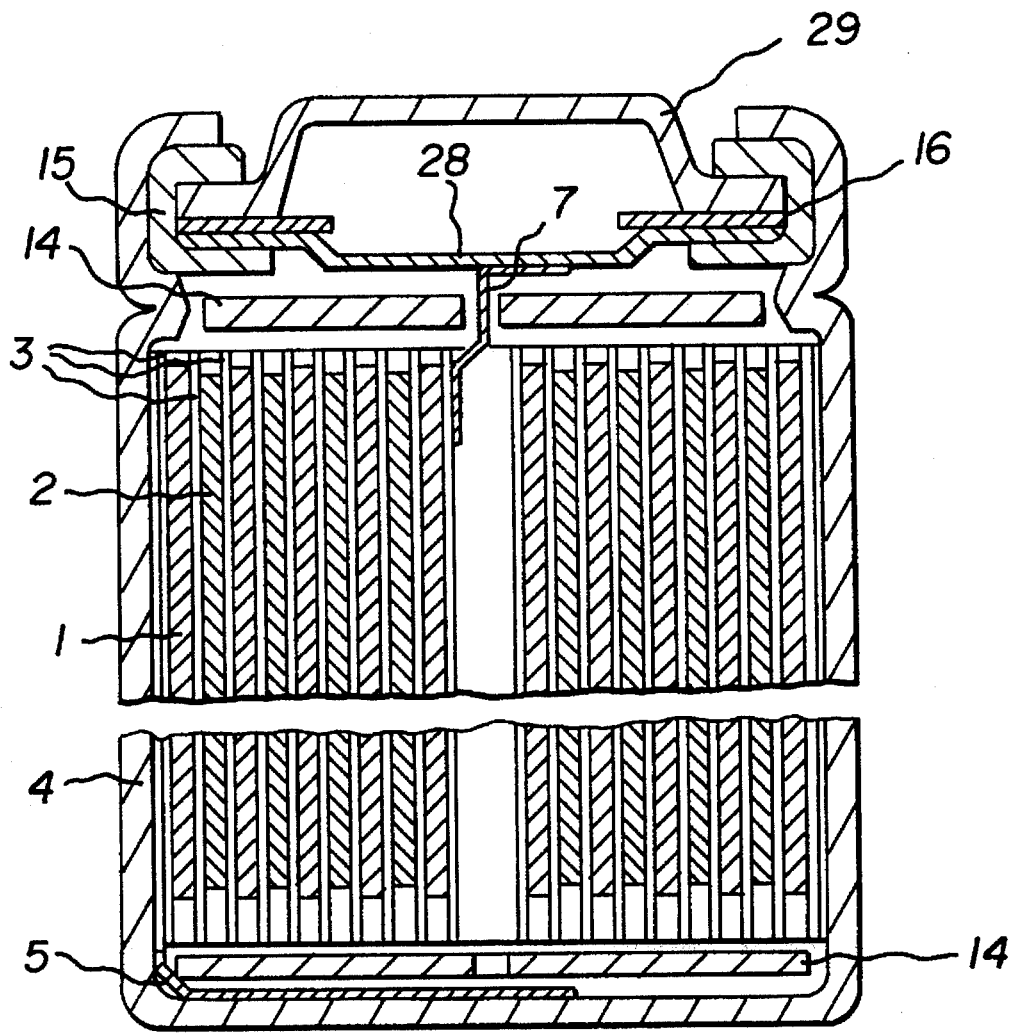
FIG. 1 is a schematic view in section showing the construction of a cell embodying the invention.

The present invention will be described below in greater detail with reference to the following examples.

EXAMPLE 1

The present cell is explained in detail with reference to FIG. 1.

Spinel-type lithium manganese oxide ($LiMn_2O_4$) was first prepared as a positive electrode active substance.

Manganese dioxide ($MnO_2$) and lithium carbonate ($Li_2CO_3$) were thoroughly mixed together in a ratio of 1 mole to 0.27 mole, and the mixture was baked in air at 750° C. for 12 hours to obtain lithium manganese oxide ($LiMn_2O_4$) serving as the positive electrode active substance. X-ray diffraction revealed that the diffraction pattern of the lithium manganese oxide thus prepared was well in match with that of spinel-type $LiMn_2O_4$. More precisely, however, the valence analysis of manganese indicated that the product corresponded to the compound wherein the manganese was partly replaced by lithium, i.e., $Li_{1.05}Mn_{1.95}O_4$.

Next, a spinel-type lithium titanium oxide was prepared for use as a negative electrode active substance. Existing spinel-type lithium titanium oxides are represented by the formula $Li_{1+x}Ti_{2-x}O_4$ wherein x is in the range of $0 \leq x \leq 1/3$. Preliminary experiments revealed that the value x in $Li_{1+x}Ti_{2-x}O_4$ should be in the range of $0 \leq x \leq 0.25$ when to be effective, and that to ensure satisfactory reversibility in reverse charging, x is preferably in the range of $0.01 \leq x \leq 0.25$, more preferably $0.03 \leq x \leq 0.22$. Accordingly, the invention was practiced with x=0.035 in the present example.

Titanium dioxide ($TiO_2$, anatase) and lithium carbonate ($Li_2CO_3$) were thoroughly mixed together in a ratio of 1 mole to 1 mole, and the mixture was baked in air at 750° C. for 24 hours to prepare $Li_2TiO_3$.

The Li$_2$TiO$_3$ prepared was further thoroughly mixed with titanium dioxide (TiO$_2$, anatase) and metallic titanium powder in a molar ratio of 2.07:4.895:0.895. The mixture was placed into a quartz tube, which was then closed in a vacuum, placed into an electric furnace, heated to 850° C. at a rate of 150° C./hour and maintained at 850° C. for 16 hours for reaction to prepare a lithium titanium complex oxide (Li$_{1\times035}$Ti$_{1.965}$O$_4$). The reaction is represented by Equation (5) below (wherein x is 0.035).

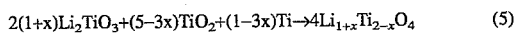
$$2(1+x)Li_2TiO_3+(5-3x)TiO_2+(1-3x)Ti \rightarrow 4Li_{1+x}Ti_{2-x}O_4 \qquad (5)$$

The lithium manganese oxide prepared (90 parts by weight) was mixed with 3 parts by weight of carbon black, 4 parts by weight of graphite and 3 parts by weight of polyvinylidene fluoride serving as a binder in a wet state using N-methyl-2-pyrrolidone as a solvent to obtain a slurry (paste). Aluminum foil having a thickness of 0.02 mm and serving as a collector was then uniformly coated with the slurry over opposite surfaces, then dried and thereafter pressed by a roller press to prepare a positive electrode sheet having a thickness of 0.15 mm. The sheet was cut into two kinds of positive electrodes 2a having a length of 465 mm and a large or small width (54 mm or 49 mm).

Similarly, the lithium titanium oxide (90 parts by weight) prepared as described above was mixed with 3 parts by weight of carbon black, 4 parts by weight of graphite and 3 parts by weight of polyvinylidene fluoride serving as a binder in a wet state using N-methyl-2-pyrrolidone as a solvent to obtain a slurry. Aluminum foil having a thickness of 0.02 mm and serving as a collector was then uniformly coated with the slurry over opposite surfaces, then dried and thereafter pressed by a roller press to prepare a negative electrode sheet having a thickness of 0.15 mm. The sheet was cut into two kinds of negative electrodes 1a having a length of 511 mm and a large or small width (57 mm or 52 mm). Besides aluminum mentioned, an aluminum alloy is usable for the positive and negative electrode collectors.

Subsequently, each of the negative electrodes 1a of large width was combined with each of the positive electrodes 2a of large width, and each negative electrode 1a of small width with each positive electrode 2a of small width. Each of the combinations was wound into a roll with a porous polypropylene separator 3 interposed between the negative electrode 1a and the positive electrode 2a to obtain a cell assembly having an average outside diameter of 15.7 mm. An insulating plate 14 was placed on the bottom of a cell can 4 of aluminum, and the cell assembly was accommodated in the can. Besides aluminum, an aluminum alloy was usable for making the cell can.

A negative electrode lead 5 extending from the cell assembly was welded to the bottom of the cell can. A solution of 1 mole/liter of LiPF$_6$ in a mixture of ethylene carbonate (EC) and diethyl carbonate (DEC) was poured into the cell can as an electrolyte. An insulating plate 14 was thereafter placed also over the cell assembly, a gasket 15 is fitted in, and an explosion-proof valve 28 was installed in the can as shown in FIG. 1. A positive electrode lead 7 extending from the cell assembly was welded to the valve before the electrolyte was poured in.

A closure 29 serving as a positive electrode external terminal was provided over the explosion-proof valve with an annular PTC element 16 interposed therebetween, and the edge of the cell can was crimped. In this way, cells A$_1$ and cells A$_2$ were prepared which had the construction shown in FIG. 1, the cells A$_1$ comprising electrodes of large width and measuring 16.5 mm in outside diameter and 65 mm in height, the cells A$_2$ comprising electrodes of small width and measuring 16.5 mm in outside diameter and 60 mm in height.

COMPARATIVE EXAMPLE 1

Lithium ion secondary cells Y which are the highest in the degree of completion as nonaqueous electrolyte secondary cells of the prior art were prepared to compare the cells with those of Example 1 in overdischarge performance.

The lithium ion secondary cells Y had the construction of FIG. 1 wherein the negative electrode was a carbon electrode, and the positive electrode was an electrode comprising the same lithium manganese oxide as in Example 1 as its active substance.

First, 4 parts by weight of acetylene black and 10 parts by weight of polyvinylidene fluoride (PVDF) serving as a binder were added to mesocarbon beads (d002=3.37Å) heat-treated at 2800° C., and the materials were mixed together wet using N-methyl-2pyrrolidone as a solvent to obtain a slurry (paste). Copper foil having a thickness of 0.02 mm and serving as a collector was uniformly coated with the slurry over opposite surfaces, dried, and thereafter pressed by a roller press to prepare a negative electrode sheet having a thickness of 0.15. mm. The sheet was cut into two kinds of negative electrodes 1b having a length of 511 mm and a large or small width (57 mm or 52 mm).

Two kinds of positive electrodes 2a which were different in width (54 mm or 49 mm) were prepared in the same manner as those of Example 1 for use in the present comparative example. Each of the negative electrodes 1b of large width was combined with each of the positive electrodes 2a of large width, and each negative electrode 1b of small width with each positive electrode 2a of small width. Each of the combinations were made into a roll in the same manner as in Example 1 to prepare a cell assembly, which was encased in an iron cell can 4b plated with nickel. The same electrolyte as used in Example 1 was poured into the can, which was finally crimped along the edge. In this way, cells Y$_1$ and Y$_2$ were fabricated which had the construction of FIG. 1 as in the case of Example 1, the cells Y$_1$ comprising electrodes of large width and measuring 16.5 mm in outside diameter and 65 mm in height, the cells Y$_2$ comprising electrodes of small width and measuring 16.5 mm in outside diameter and 60 mm in height.

COMPARATIVE EXAMPLE 2

Nonaqueous electrolyte secondary cells Z were prepared to compare these cells with the cells of Example 1 in overdischarge performance, using as an active substance for the positive electrode lithium cobalt oxide (LiCoO$_2$) which is a typical positive electrode material for lithium ion secondary cells, and as a negative electrode active substance the same spinel-type lithium titanium oxide as used in Example 1. The crystal structure of LiCoO$_2$ is not the spinel structure but of the α-NaFeO$_2$ type having a layer structure.

Lithium carbonate (Li$_2$CO$_3$) and cobalt carbonate (COCO$_3$) were mixed together in an Li to Co atomic ratio of 1.03:1, and the mixture was baked in air at 900° C. for about 10 hours to obtain LiCoO$_2$. Since the LiCoO$_2$ as baked was in the form of a very hard block, the block was treated by a pulverizer and made into a powder having a mean particle size of 0.01 mm.

The LiCoO$_3$ thus prepared (90 parts by weight) was mixed with 3 parts by weight of carbon black, 4 parts by weight of graphite and 3 parts by weight of polyvinylidene fluoride serving as a binder in a wet state using N-methyl-2-pyrrolidone as a solvent to obtain a slurry. Subsequently, aluminum foil having a thickness of 0.02 mm and serving as a collector was uniformly coated with the slurry over opposite surfaces, dried, and thereafter pressed by a roller press to prepare a positive electrode sheet having a thickness of 0.15 mm. The sheet was cut into two kinds of positive electrodes 2c having a length of 465 mm and a large or small width (54 mm or 49 mm).

Two kinds of cells were prepared in the present comparative example with use of electrodes 1a which were different in width (57 mm or 52 mm) and prepared in the same manner as in Example 1. Each negative electrode 1a of large width was combined with each positive electrode 2c of large width, and each negative electrode 1a of small width with each positive electrode 2c of small width. Each of the combinations were made into a roll in the same manner as in Example 1 to prepare a cell assembly, which was encased in an aluminum cell can 4. The same electrolyte as used in Example 1 was poured into the can, which was finally crimped along the edge. In this way, cells $Z_1$ and cells $Z_2$ were fabricated which had the construction of FIG. 1 as in the case of Example 1, the cells $Z_1$ comprising electrodes of large width and measuring 16.5 mm in outside diameter and 65 mm in height, the cells $Z_2$ comprising electrodes of small width and measuring 16.5 mm in outside diameter and 60 mm in height.

TEST RESULT 1 (PERFORMANCE TEST OF CELLS)

Cells A prepared in Example 1 were charged for 8 hours with the charging upper limit voltage set at 3.2 V and discharged at a constant current of 200 mA to a final voltage of 2.0 V to determine the initial discharge capacity of cells $A_1$, $A_2$. One of the cells $A_1$ and one of the cells $A_2$ were thereafter subjected to a charge-discharge cycle test by charging each cell at a constant current of 500 mA for 2.5 hours with the charging upper limit voltage set at 3.2 V again and discharging the cell at a constant current of 380 mA to a final voltage of 2.0 V.

Cells Y prepared in Comparative Example 1 were charged for 8 hours with the charging upper limit voltage set at 4.2 V and discharged at a constant current of 200 mA to final voltage of 3.0 V to determine the initial discharge capacity of cells $Y_1$, $Y_2$. One of the cells $Y_1$ and one of the cells $Y_2$ were thereafter subjected to a charge-discharge cycle test charging each cell at a constant current of 500 mA for 2.5 hours with the charging upper limit voltage set at 4.2 V again and discharging the cell at a constant current of 380 mA to a final voltage of 3.0 V.

Cells Z prepared in Comparative Example 2 were charged for 8 hours with the charging upper limit voltage set at 3.1 V and discharged at a constant current of 200 mA to a final voltage of 2.0 V to determine the initial discharge capacity of the cells $Z_1$, $Z_2$. One of the cells $Z_1$ and one of the cells $Z_2$ were thereafter subjected to a charge-discharge cycle test by charging each cell at a constant current of 500 mA for 2.5 hours with the charging upper limit voltage set at 3.1 V again and discharging the cell at a constant current of 380 mA to a final voltage of 2.0 V.

Figure 2:
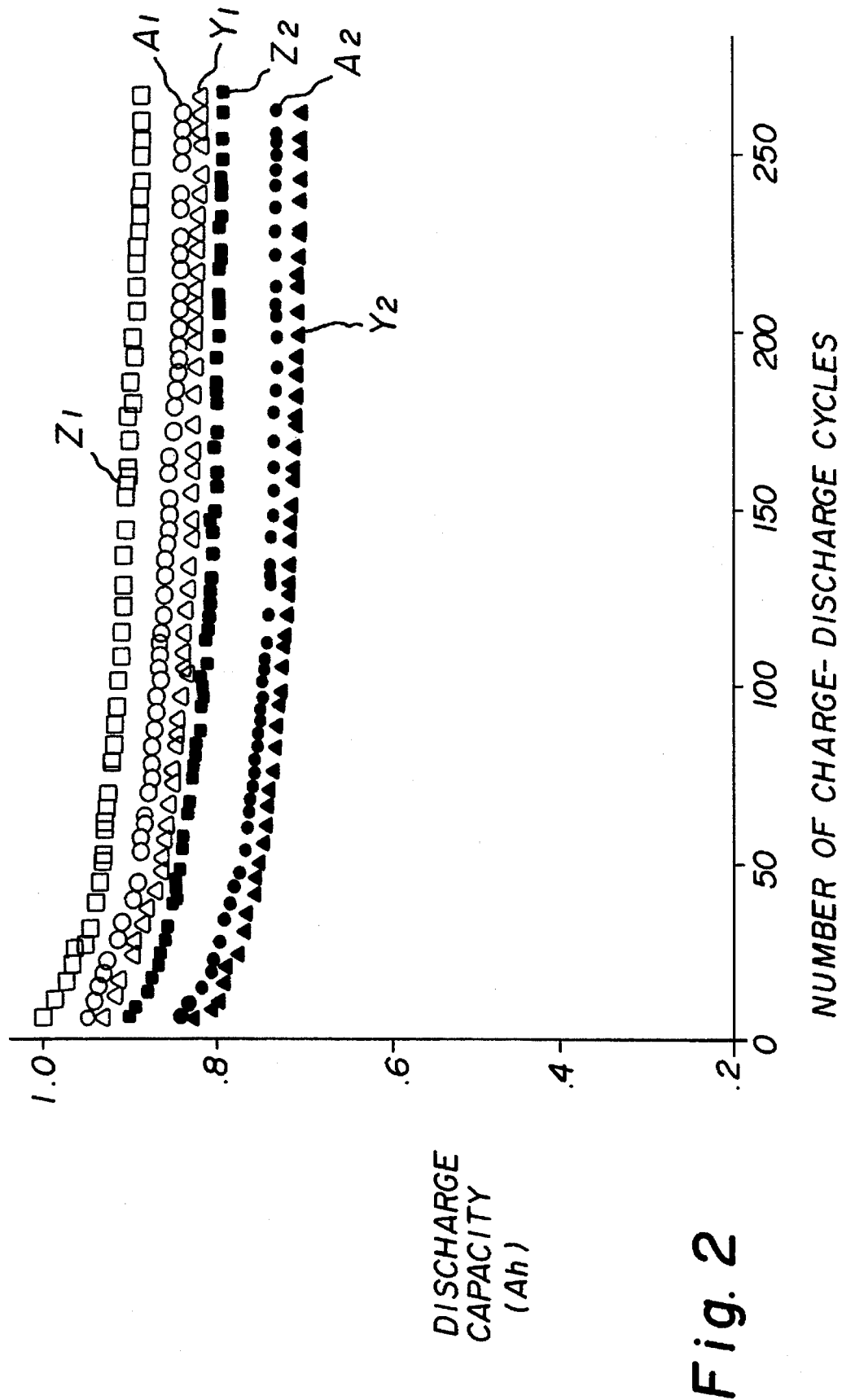
FIG. 2 shows the charge-discharge cycle characteristics of cells.

Table 1 shows the initial capacity of the cells. FIG. 2 shows the result of the cell cycle test.

TABLE 1

| Cell | Initial Capacity (mAh) |
|---|---|
| $A_1$ | 989 |
| $A_2$ | 890 |
| $Y_1$ | 984 |
| $Y_2$ | 886 |
| $Z_1$ | 1050 |
| $Z_2$ | 947 |

(The initial capacity value is the average of five cells.)

The cells $A_2$, $Y_2$, and $Z_2$ are 10% smaller in electrode width and are therefore about 10% smaller in initial capacity than the cells $A_1$, $Y_1$, and $Z_1$.

As shown in FIG. 2, the cycle tests revealed that all the cells retained a discharge capacity corresponding to at least 85% of the initial value even after 250 charge-discharge cycles, hence satisfactory cycle characteristics.

TEST RESULT 2 (FORCED DISCHARGE CYCLE TEST)

One cell $A_2$ fabricated in Example 1 was charged at a constant current of 500 mA for 2.5 hours with the charging upper limit voltage set at 3.2 V and forcibly discharged at a constant current of 460 mA for 2.5 hours. In this way, the cell was repeatedly charged and discharged. FIG. 3 shows the charge-discharge voltage curve obtained by this procedure. FIG. 3 shows the cell voltage at the end of the 9th discharge, cell voltage variations during the subsequent 10th charging, cell voltage variations during the 10th discharge and cell voltage variations with the start of the 11th charging. The cell $A_2$ can be discharged at a voltage of not lower than 2 V (usual final voltage) for about 1.7 hours, and is thereafter forcibly discharged with a marked drop in cell voltage, overdischarged to below 0 V and further reversely charged for the cell voltage to reach −0.4 V. However, the cell is restored to a voltage of at least 3 V when subsequently charged, exhibiting the same discharge characteristics again when discharged next. FIG. 3 reveals that even after an overdischarge to below 0 V, the cell A of the invention can be restored completely by the subsequent charging.

Similarly, one cell $Y_2$ fabricated in Comparative Example 1 was repeatedly charged and discharged by the procedure of charging the cell at a constant current of 500 mA for 2.5 hours with the charging upper limit voltage set at 4.2 V and forcibly discharging the cell at a constant current of 460 mA for 2.5 hours.

It was possible to discharge the cell $Y_2$ at a voltage of not lower than 3 V (usual final voltage) for about 1.8 hours by the first discharge. The cell voltage thereafter markedly dropped through an overdischarge to below 0 V, temporarily reached −0.2 V through reverse charging and reached 0 V immediately thereafter. By the time the cell voltage reached 0 V, the cell internally short-circuited and was no longer chargeable the second time. With the lithium ion secondary cell wherein the negative electrode active substance is a carbon material, the lithium doping the carbon as the negative electrode active substance no longer remains therein owing to overdischarge, so that the negative electrode collector (copper) dissolves out into the electrolyte through a negative electrode reaction. The dissolving-out copper deposits on the positive electrode and then penetrates through the separator to cause a short circuit.

Furthermore, one cell $Z_2$ fabricated in Comparative Example 2 was repeatedly charged and discharged by repeating the procedure of charging the cell at a constant current of 500 mA for 2.5 hours with the charging upper limit voltage set at 3.1 V and forcibly discharging the cell at a constant current of 460 mA for 2.5 hours.

It was possible to discharge the cell $Z_2$ at a voltage of not lower than 2 V for about 2 hours by the first discharge. The cell was thereafter overdischarged to below 0 V with marked drop in cell voltage and reversely charged to a voltage of −1.5 V. The time taken for charging to increase the cell voltage to the upper limit voltage gradually decreased in the second and following cycles. The discharge time during which the cell was dischargeable at a voltage of at least 2 V gradually shortened in the second and following cycles and reduced to as short as 40 minutes in the 10th cycle. In the case where the positive electrode active substance is not a spinel oxide but $LiCoO_2$ of layer structure although the negative electrode active substance is the same lithium titanium oxide as used for the cell A, the cell is thus impaired seriously in performance by repeated overdischarges because the reaction of $LiCoO_2$ during overdischarge is not reversible.

TEST RESULT 3 (CHARGE-DISCHARGE CYCLE TESTS OF BATTERIES)

Three cells $A_1$ and one cell $A_2$ prepared in Example 1 were connected in series to obtain a battery $3A_1+A_2$. The battery $3A_1+A_2$ was repeatedly charged and discharged by the procedure of charging the battery at a constant voltage of 500 mA for 2.5 hours with the charging upper limit voltage set at 12.8 V and discharging the battery at a constant current of 460 mA to a final voltage of 6V.

Two cells $Y_1$ and one cell $Y_2$ prepared in Comparative Example 1 were also connected in series to obtain a battery $2Y_1+Y_2$. The battery $2Y_1+Y_2$ was repeatedly charged and discharged by the procedure of charging the battery at a constant current of 500 mA for 2.5 hours with the charging upper limit voltage set at 12.6 V and discharging the battery at a constant current of 460 mA to a final voltage of 6V.

Furthermore, three cells $Z_1$ and one cell $Z_2$ prepared in Comparative Example 2 were connected in series to obtain a battery $3Z_1+Z_2$. The battery $3Z_1+Z_2$ was repeatedly charged and discharged by the procedure of charging the battery at a constant current of 500 mA for 2.5 hours with the charging upper limit voltage set at 12.4 V and discharging the battery at a constant current of 460 mA to a final voltage of 6 V.

FIG. 4 shows the result of charge-discharge cycle tests of the batteries.

The cell $A_2$ is 10% smaller in the electrode width and is therefore about 10% smaller in the initial capacity than the cell $A_1$ as listed in Table 1. Accordingly, when the battery $3A_1+A_2$ has been discharged to the final voltage of 6 V, the combined voltage of the three cells $A_1$ is still at least 6 V, whereas the cell $A_2$ has been discharged to a voltage of up to 0 V. However, the foregoing test result 2 indicates that even after overdischarge to below 0 V, the cell $A_2$ is completely restored by the subsequent charging, so that the charged-discharge cycles result in only a very slight reduction in the discharge capacity as shown in FIG. 4, permitting the battery to exhibit satisfactory cycle characteristics.

Thus, when a large number of cells A are connected in series into a battery, the battery has satisfactory cycle characteristics since the battery will not be impaired in performance by overdischarge even when the cells are different in capacity.

On the other hand, in the case where cells Y and cells Z of the comparative examples are connected in series into a battery $2Y_1+A_2$ and battery $3Z_1+Z_2$, respectively, the cells $Y_2$, $Z_2$ are 10% smaller in the electrode width are therefore about 10% smaller in capacity than the cells $Y_1$, $Z_1$. Accordingly, when the battery $2Y_1+Y_2$ has been discharged to the final voltage of 6 V, the combined voltage of the two cells $Y_1$ is still at least 6 V, but the cell $Y_2$ has been overdischarged to a voltage of up to 0 V. As previously described, the lithium doping carbon serving as the negative electrode active substance no longer remains therein when the cell Y has been overdischarged to 0 V or lower, so that the negative electrode collector (copper) dissolves out into the electrolyte through a negative electrode reaction, and the dissolving-out copper deposits on the positive electrode and penetrates through the separator to cause a short circuit. Consequently, after the cell $Y_2$ has short-circuited internally, the battery $2Y_1+Y_2$ becomes equivalent to a battery $2Y_1$ composed of the two cells $Y_1$ connected in series. It therefore follows that the charging voltage of 12.6 V will be impressed on the two cells by the subsequent charging. Since the proper charging upper limit voltage for the cells $Y_1$ is 4.2 V, the two cells $Y_1$, will be overcharged if the charging voltage of 12.6 V(6.3 V/cell) is applied thereto. Thus, the battery fails to function when subjected to only several charge-discharge cycles as shown in FIG. 4.

Thus, in the case where a plurality of nonaqueous electrolyte secondary cells wherein a carbonaceous material is used as the negative electrode active substance according to the prior art are connected in series into a battery, the cell of smaller capacity is overdischarged if the cells differ in capacity, seriously impairing the cycle characteristics of the battery.

Further, when the battery $3Z_1+Z_2$ has been discharged to the final voltage of 6 V, the combined voltage of the three cells $Z_1$ is still at least 6 V, but the cell $Z_2$ has been overdischarged to a voltage of up to 0 V. As previously described with reference to the test result 2, the reaction of $LiCoO_2$ at the positive electrode for which the $LiCoO_2$ is used as the active substance is not reversible during overdischarge, so that the cell $Z_2$ is seriously impaired in performance by repeated overdischarges, consequently impairing the performance of the battery $3Z_1+Z_2$ greatly.

TEST RESULT 4

Two cells $Y_1$ prepared in Comparative Example 1 and one cell $A_2$ fabricated in Example 1 were connected in series into a battery $2Y_1+A_2$.

The battery $2Y_1+A_2$ was repeatedly charged and discharged by the procedure of charging the battery at a constant current of 500 mA for 2.5 hours with the charging upper limit voltage set at 11.6 V and discharging the battery at a constant current of 460 mA to a final voltage of 6 V.

As listed in Table 1, the cell $A_2$ is about 10% smaller than the cell $Y_1$ in initial capacity. Accordingly, when the battery $2Y_1+A_2$ has been discharged to the final voltage of 6 V, the combined voltage of the two cells $Y_1$, is still at least 6 V, but the cell $A_2$ has been overdischarged to a voltage of up to 0 V. Nevertheless, the foregoing test result 2 indicates that even after overdischarged to below 0 V, the cell $A_2$ is completely restored by the subsequent charging, so that as shown in FIG. 4, the charge-discharge cycles result in only a slight reduction in the discharge capacity of the battery $2Y_1+A_2$, which therefore has satisfactory cycle characteristics.

Thus, in the case where a battery is fabricated using the cell A of the invention in combination with cells of other type which will be markedly impaired in performance by overdischarge, the cell A is made to have the smallest capacity. The battery can then be given satisfactory cycle characteristics because the battery is discharged to the final voltage with the cell A overdischarged but without the likelihood of overdischarge of the other cells.

What is claimed is:

1. In a secondary cell comprising as encased in a closed container a positive electrode having a positive electrode collector, a negative electrode having a negative electrode collector and a nonaqueous electrolyte containing lithium ions, said nonaqueous electrolyte secondary cell characterized in that active materials forming the positive electrode and the negative electrode respectively are each a lithium-containing metallic oxide of the spinel type.

2. A nonaqueous electrolyte secondary cell as defined in claim 1 which is characterized in that the active material of the positive electrode is a lithium manganese oxide of the spinel type, and the active material of the negative electrode is a lithium titanium oxide of the spinel type.

3. In a battery comprising at least two nonaqueous electrolyte secondary cells connected in series, a nonaqueous electrolyte secondary battery characterized in that at least one of the cells is a cell as defined in claim 1 or 2.

4. A nonaqueous electrolyte secondary cell as defined in claim 1 or 2 which is characterized in that aluminum or an aluminum alloy is used for the negative electrode collector.

5. A nonaqueous electrolyte secondary cell as defined in claim 4 which is characterized in that the container is a metal can at least having an inner surface of aluminum or an aluminum alloy.

6. A nonaqueous electrolyte secondary cell as defined in claim 2 which is characterized in that the spinel-type lithium titanium oxide is represented by the formula $Li_{1+x}Ti_{2-x}O_4$ wherein x is in the range of $0 \leq x \leq 0.25$.

* * * * *